United States Patent [19]

Fisher

[11] 4,414,180
[45] Nov. 8, 1983

[54] METHOD FOR GENERATING CHLORINE DIOXIDE GAS

[76] Inventor: Robert P. Fisher, 4909 NW. 17th Pl., Gainesville, Fla.

[21] Appl. No.: 310,459

[22] Filed: Oct. 13, 1981

[51] Int. Cl.$^3$ .............................................. B01J 19/12
[52] U.S. Cl. ................................. 422/186; 422/186.3; 204/157.1 R
[58] Field of Search .............. 204/157.1 R; 422/186.3, 422/186

[56] References Cited

U.S. PATENT DOCUMENTS

| | | | |
|---|---|---|---|
| 3,429,793 | 2/1969 | Hellund | 204/157.1 R |
| 3,790,801 | 2/1974 | Coleman | 422/186.3 |
| 3,993,911 | 11/1976 | Graentzel | 422/186.3 |
| 4,199,419 | 4/1980 | Holroyd et al. | 204/157.1 R |

Primary Examiner—Howard S. Williams
Assistant Examiner—Terryence F. Chapman
Attorney, Agent, or Firm—A. W. Fisher, III

[57] ABSTRACT

A chlorine dioxide generator and method for generating chlorine dioxide gas from sodium chlorite through the use of photochemical oxidation, the chlorine dioxide generator comprising a base to operatively support an enlarged hollow substantially cylindrical housing having a lid with a centrally disposed aperture formed therein removably disposed on the upper portion thereof; a chlorine dioxide gas generating chamber supported on the base within the enlarged hollow substantially cylindrical enclosure comprising an elongated substantially cylindrical hollow reaction tube having a reduced upper end, a gas conduit member mounted on the upper portion and partially disposed within the elongated substantially cylindrical transparent hollow reaction tube, said gas conduit member being comprised of an innermost hollow inert gas delivery tube coaxially disposed within the substantially cylindrical transparent hollow reaction tube, and an opaque hollow substantially cylindrical shield including a plurality of apertures formed in the lower portion thereof and disposed coaxially between the innermost hollow inert gas delivery tube and the substantially cylindrical transparent hollow reaction tube, thereby forming an inner chlorine dioxide gas discharge portion and an innermost inert gas supply portion, a light source disposed adjacent the chlorine dioxide generating chamber wherein the light source radiates the chlorine dioxide gas generating chamber to photochemically oxidize the sodium chlorite to produce chlorine dioxide in an aqueous phase which is swept into a gas phase by an inert gas from the innermost inert gas supply portion and discharged through the inner chlorine dioxide gas discharge portion.

4 Claims, 2 Drawing Figures

METHOD FOR GENERATING CHLORINE DIOXIDE GAS

BACKGROUND OF THE INVENTION

1. Field of the Invention

A chlorine dioxide generator and method for generating chlorine dioxide gas from sodium chlorite through photochemical oxidation.

2. Description of the Prior Art

In order to examine analytical methods for the measurement of chlorine dioxide ($ClO_2$) in workplace atmospheres, it is necessary to generate a low concentration test gas containing $ClO_2$. Commonly static test gases have been employed in analysis methods studies. To accomplish this, static test gases of accurately known concentration may be generated employing techniques wherein headspace chlorine dioxide of high concentration is diluted with air in a Tedler gas bag. Unfortunately, the difficulty with employing static $ClO_2$ test gases is that $ClO_2$ is very reactive, so that, for example, a test gas containing 0.1 parts-per-million $ClO_2$ will decompose to other species at a rate of 5 to 20% per hour.

Generally, dynamic test gases are preferred to static test gases for several reasons, and specifically considering reactive species, most dynamic test gas systems show considerably greater concentration stability with time. Because of the very high reactivity of chlorine dioxide, however, standard equipment for generating dynamic test gases, e.g., commercially prepared cylinder gas mixtures and permeation tubes, is not available.

One method for generating dynamic chlorine dioxide test gas mixtures has been evaluated by applicant and found successful: chlorine at low concentrations in air may be bubbled into sodium chlorite solution in a standard laboratory gas washing bottle. If the chlorine concentration is kept low enough, chlorine breakthrough will not occur, and the output of the generator is stable. This method is superior to that of Saltzman (Saltzman, B. E., *Analytical Chemistry*, 33, 1100, 1961; also Kusnetz, H. L., et al., *American Industrial Hygiene Association Journal*, 21, 361 (1960)) in that applicant's studies have shown that method, in which chlorine is passed through solid sodium chlorite, to permit chlorine breakthrough. The disadvantage of the method is that chlorine breakthrough is still a possibility, hence test gas monitoring with a simple total oxidant analyzer is not foolproof.

A potentially superior means of generating a dynamic chlorine dioxide test gas has been reported by G. Ishii (*Chemical Engineering, Japan*, 22 (3), 164 (1958)), in which sodium chlorite in aqueous solution was electrolyzed at the anode of a diaphragm cell, to produce chlorine dioxide which was swept from the liquid into the gas phase. This procedure has not been tested for production of low concentration $ClO_2$ although test gas dilution is possible. The method suffers the disadvantage of requiring reasonably sophisticated electrochemical equipment for construction of the $ClO_2$ generator.

Other examples of the prior art are found in "The Photodecomposition of Chlorine Dioxide Solution," *Proceedings of the Chemical Society*, E. J. Bowen, and W. M. Cheung, 120, 1932; "The Action of Light on Chlorine Dioxide," *Proceedings of the Chemical Society*, H. Booth and E. J. Bowen, 510, 1925; and in U.S. Pat. Nos. 2,043,284; 2,475,285; 2,683,651; 3,056,270; 3,285,842; 3,429,793; 3,649,493; 3,718,557; and 3,763,006.

SUMMARY OF THE INVENTION

The present invention relates to a chlorine dioxide generator and method for generating chlorine dioxide gas by metering nitrogen or air directly into a generator containing aqueous sodium chlorite, and illuminating by one or more incandescent or fluorescent lamps. The sodium chlorite is photochemically oxidized to chlorine dioxide and the resulting $ClO_2$ is taken into the gas phase by the nitrogen or air gas stream.

More specifically, the chlorine dioxide generator comprises a base and enclosure.

The chlorine dioxide gas generating chamber comprises a reaction tube to retain the sodium chlorite solution and to permit photochemical oxidation of the chlorite to aqueous phase chlorine dioxide, and a gas conduit member operatively disposed therein. The gas conduit member is comprised of an innermost hollow inert gas delivery tube coaxially disposed within the reaction tube, and an opaque hollow cylindrical shield, including a plurality of apertures formed in the lower portion thereof and disposed coaxially between the innermost hollow inert gas delivery tube and the reaction tube. There is formed by the spaced relation of the opaque shield and the innermost inert gas supply portion, an inner chlorine dioxide gas discharge portion, which is in open communication with an outlet conduit with an outlet aperture formed in the outer portion thereof. A plurality of lamps are disposed about the periphery of the chlorine dioxide generating chamber which are operatively coupled to an electrical energy source.

In use, the innermost gas supply portion is operatively coupled to a gas supply and the inner chlorine dioxide gas discharge portion between the opaque shield and the innermost gas supply portion is coupled to a receiving chamber. An aqueous solution of sodium or other chlorite is placed within the reaction chamber permitting the light source to radiate energy to the aqueous solution causing photochemical oxidation of the sodium chlorite to generate chlorine dioxide in the aqueous solution. Gas is bubbled through the aqueous solution through the innermost gas delivery tube and thereafter into the inner chlorine dioxide gas discharge portion, wherein gas bubbles rise to the surface of the sodium chlorite solution, shielded from light. Aqueous phase chlorine dioxide is permitted to pass through apertures into the inner chlorine dioxide gas discharge portion, to prevent photodecomposition of the chlorine dioxide, once it enters the gas phase. As the chlorine dioxide passes upwardly through the inner chlorine dioxide gas discharge portion it is expelled through the outer conduit discharge aperture to the collecting point.

The invention accordingly comprises the features of construction, combination of elements, and arrangement of parts that will be exemplified in the construction hereinafter set fourth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

The present invention relates to a chlorine dioxide generator and method for generating chlorine dioxide gas by metering nitrogen or air directly into a generator containing aqueous sodium chlorite. The gas generator is illuminated by one or more incandescent or fluorescent lamps. The sodium chlorite is photochemically oxidized to chlorine dioxide and the resulting $ClO_2$ is taken into the gas phase by the nitrogen or air gas stream. The concentration of chlorine dioxide produced in the gas stream is dependent upon the nitrogen or air flow rate and the intensity (flux) of the light incident upon the generator. Photolysis of the generated gas phase $ClO_2$ is precluded by an opaque, substantially cylindrical shield.

Figure 1:
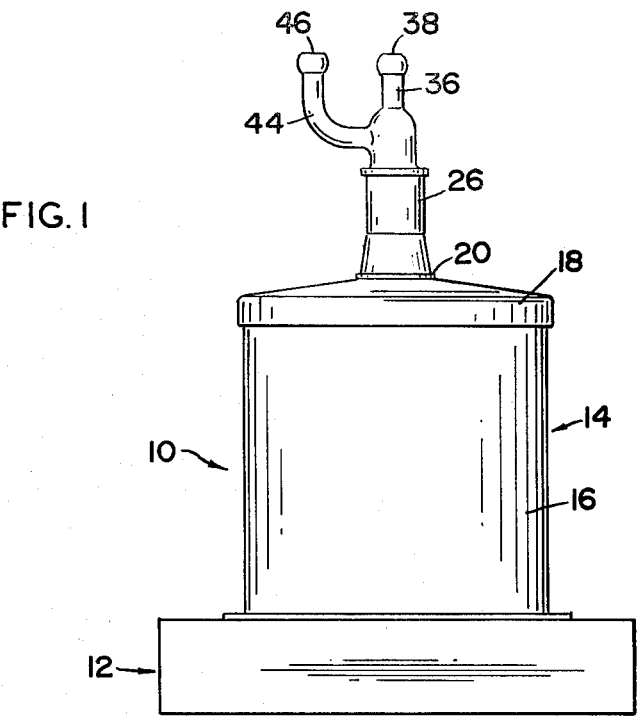
FIG. 1 is a side view of the assembled chlorine dioxide generator.
Figure 2:
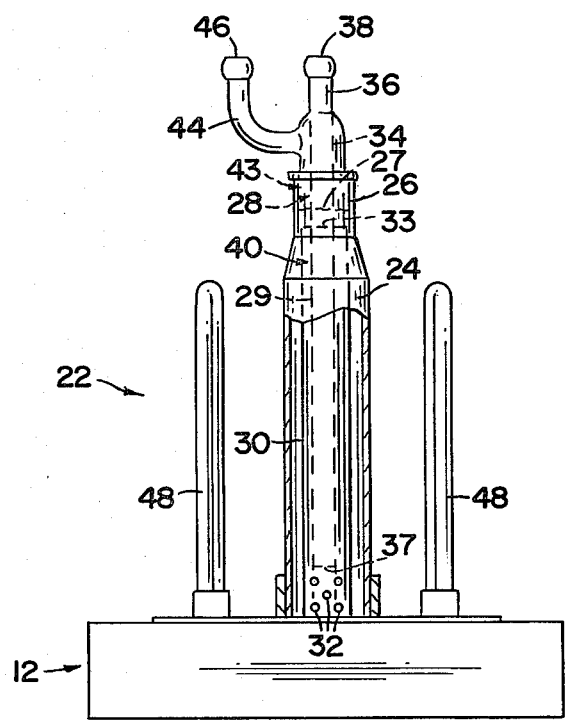
FIG. 2 is a detailed side view of the chlorine dioxide gas generating chamber and light source.

More specifically, as shown in FIGS. 1 and 2 the chlorine dioxide generator generally indicated as 10 comprises a base and enclosure generally indicated as 12 and 14 respectively. The enclosure 14 comprises an enlarged hollow substantially cylindrical housing 16, the internal side of which is highly reflective, having a lid 18 removably disposed on the upper portion thereof. The lid 18 includes a centrally disposed aperture 20 to operatively receive the upper portion of the chlorine dioxide gas generator chamber 22 more fully described hereinafter.

The chlorine dioxide gas generating chamber 22 comprises an elongated substantially transparent hollow reaction tube 24 having a reduced upper portion 26 wherein the upper level of the sodium chlorite solution is initially established, indicated as 27. A gas conduit member generally indicated as 28 is operatively mounted in the upper portion and disposed within the reduced upper end 26. The gas conduit member 28 is comprised of an innermost hollow inert gas delivery tube 29 coaxially disposed within the reaction tube 24, and an opaque, hollow, cylindrical shield 30, having formed on the lower portion thereof a plurality of apertures indicated as 32. The upper termination 33 of shield 30 is above the level of the lid 18 opening 20, but below the level of the sodium chlorite solution 27. The shield rests upon the bottom of the reaction tube 24 and is maintained coaxially about the innermost hollow inert gas delivery tube 29 by equal length projections (not shown) affixed radially to the delivery tube. The gas conduit member 28 thus comprises an innermost gas supply portion, consisting of the hollow inert gas delivery tube 29 affixed to inlet conduit 36 and inlet aperture 38 formed thereon, with an outlet 37 disposed within the shield at a position above the level of the apertures 32, and the opaque shield 30 with apertures 32, described above, and an inner chlorine dioxide gas discharge portion 40, which is formed by the spaced relationship of the opaque shield and the innermost inlet gas supply portion. This inner chlorine dioxide gas discharge portion is in open communication with an outlet conduit 44 and outlet aperture 46 formed in the outer portion thereof. A plurality of incandescent or fluorescent lamps 48 are disposed about the periphery of the chlorine dioxide generating chamber 22 and are operatively coupled to an electrical energy source (not shown).

In use, the inner gas supply portion is operatively coupled to a gas supply (not shown) and the chlorine dioxide gas discharge portion is coupled to a receiving chamber (not shown). An aqueous solution of sodium or other chlorite is placed within the chlorine dioxide gas generating chamber 22 permitting the light source 48 to radiate energy to the aqueous solution causing photochemical oxidation of the sodium chlorite to generate the chlorine dioxide in the aqueous solution. Gas is bubbled through the aqueous solution through the innermost inert gas delivery tube 29, and the aqueous chlorine dioxide is permitted to pass through apertures 32 into the inner chlorine dioxide gas discharge portion to prevent photodecomposition of the chlorine dioxide. As the chlorine dioxide passes upwardly through the inner chlorine dioxide gas discharge portion 40, bubbles of gas containing chlorine dioxide break the surface of the chlorite solution at 27, pass through the upper discharge portion 43, the outer conduit 44, and discharge aperture 46 to the collecting chamber (not shown). The generated chlorine dioxide exists with the generator in the gas phase solely either in the discharge portion 40, wherein it is shielded from light by the opaque shield 30, or in the upper portion 43, which is above the level of the sodium chlorite solution, and which is also shielded from the generator light source 48 by the lid 18. The concentration of gaseous chlorine dioxide produced by this method may be regulated by the flow rate of the gas as well as the intensity (flux) of the light incident on the aqueous sodium chlorite.

It will thus be seen that the objects set forth above, and those made apparent from the preceding description are efficiently attained and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language, might be said to fall therebetween.

Now that the invention has been described,
What is claimed is:

1. A chlorine dioxide generator for generating chlorine dioxide gas from a chlorite through the use of photochemical oxidation: said chlorine dioxide generator comprising a chlorine dioxide gas generating chamber operatively supported on a base including a transparent hollow reaction tube, a gas conduit member mounted on the upper portion and partially disposed within said transparent hollow reaction tube, a light source disposed adjacent said chlorine dioxide gas generating chamber and an opaque shield having a plurality of apertures formed in the lower portion thereof, disposed within said reaction tube, said gas conduit member including an innermost gas supply portion and an inner chlorine dioxide gas discharge portion, bounded externally by the opaque shield, wherein said light source radiates said chlorine dioxide gas generating chamber to photochemically oxidize the chlorite to produce chlorine dioxide in the aqueous phase which is swept into a gas phase by said innermost gas supply portion and discharged through said inner chlorine dioxide gas discharge portion.

2. The chlorine dioxide generator of claim 1 wherein said opaque shield comprises a hollow substantially cylindrical member.

3. The chlorine dioxide generator of claim 1 further including an enclosure operatively housing said chlorine dioxide gas generating chamber and said light source.

4. The chlorine dioxide generator of claim 3 wherein said enclosure comprises an enlarged hollow substantially cylindrical housing having a lid including a centrally disposed aperture formed therein to receive the upper portion of said chlorine dioxide gas generating chamber.

* * * * *